(12) United States Patent
Hamilton

(10) Patent No.: US 8,508,058 B2
(45) Date of Patent: Aug. 13, 2013

(54) ENERGY SYSTEMS, ENERGY DEVICES, ENERGY UTILIZATION METHODS, AND ENERGY TRANSFER METHODS

(75) Inventor: Scott Robert Hamilton, Spokane, WA (US)

(73) Assignee: Demand Energy Networks, Inc., Liberty Lake, WA (US)

( * ) Notice: Subject to any disclaimer, the term of this patent is extended or adjusted under 35 U.S.C. 154(b) by 0 days.

(21) Appl. No.: 13/330,548

(22) Filed: Dec. 19, 2011

(65) Prior Publication Data

US 2012/0153618 A1 Jun. 21, 2012

Related U.S. Application Data

(63) Continuation of application No. 12/165,405, filed on Jun. 30, 2008, now Pat. No. 8,097,967.

(51) Int. Cl.
*H02P 9/04* (2006.01)
*H02J 7/00* (2006.01)

(52) U.S. Cl.
USPC ............................. 290/1 A; 290/1 R; 322/37

(58) Field of Classification Search
USPC .................. 290/1 A, 1 R, 7, 40 R, 52; 322/1, 322/37
See application file for complete search history.

(56) References Cited

U.S. PATENT DOCUMENTS

| | | | |
|---|---|---|---|
| 1,279,392 A | 9/1918 | Martinetto | |
| 2,194,822 A | 3/1940 | Dannheiser | |
| 3,050,635 A | 8/1962 | Tanner | |
| 3,571,693 A | 3/1971 | Riaz | |
| 4,131,827 A * | 12/1978 | Larrabee | 318/46 |
| 4,203,041 A * | 5/1980 | Sachs | 307/67 |
| 4,465,943 A * | 8/1984 | Risberg | 307/67 |
| 4,473,792 A | 9/1984 | Nola | |
| 5,028,804 A | 7/1991 | Lauw | |
| 5,327,066 A | 7/1994 | Smith | |
| 5,422,624 A | 6/1995 | Smith | |
| 5,476,293 A | 12/1995 | Yang | |
| 5,499,181 A | 3/1996 | Smith | |
| 5,576,613 A * | 11/1996 | Yang | 322/16 |
| 5,642,270 A | 6/1997 | Green et al. | |
| 5,689,174 A * | 11/1997 | Pacheco, Sr. | 322/16 |

(Continued)

FOREIGN PATENT DOCUMENTS

| | | |
|---|---|---|
| CN | 1242883 | 1/2000 |
| CN | 200980125088.7 | 12/2012 |

(Continued)

OTHER PUBLICATIONS

U.S. Appl. No. 60/915,347, filed May 1, 2007, Bridges et al.

(Continued)

*Primary Examiner* — Nicholas Ponomarenko
(74) *Attorney, Agent, or Firm* — Wells St. John P.S.

(57) ABSTRACT

Energy systems, energy devices, energy utilization methods, and energy transfer methods are described. In one arrangement, energy utilization methods include providing first energy from a power grid to an induction generator at a first moment in time; using the induction generator and the first energy from the power grid, charging an energy storage device; using second energy from the energy storage device, powering a motor causing the induction generator to generate third energy during a second moment in time; and providing the third energy to the power grid. Other arrangements are described.

38 Claims, 6 Drawing Sheets

(56) References Cited

U.S. PATENT DOCUMENTS

| | | | |
|---|---|---|---|
| 5,717,374 A | 2/1998 | Smith | |
| 5,742,229 A | 4/1998 | Smith | |
| 5,767,584 A | 6/1998 | Gore et al. | |
| 5,798,632 A | 8/1998 | Muljadi | |
| 5,803,215 A | 9/1998 | Henze et al. | |
| 5,804,948 A * | 9/1998 | Foust | 322/16 |
| 5,806,018 A | 9/1998 | Smith et al. | |
| 5,880,537 A * | 3/1999 | Windhorn | 307/64 |
| 5,914,654 A | 6/1999 | Smith | |
| 5,931,021 A | 8/1999 | Shnaid et al. | |
| 6,018,293 A | 1/2000 | Smith | |
| 6,067,008 A | 5/2000 | Smith | |
| 6,107,691 A | 8/2000 | Gore et al. | |
| 6,185,501 B1 | 2/2001 | Smith et al. | |
| 6,323,625 B1 | 11/2001 | Bhargava | |
| 6,522,031 B2 | 2/2003 | Provanzana et al. | |
| 6,605,928 B2 | 8/2003 | Gupta et al. | |
| 6,697,951 B1 | 2/2004 | Sinha et al. | |
| 6,727,809 B1 | 4/2004 | Smith | |
| 6,779,771 B2 | 8/2004 | Ostrovsky et al. | |
| 6,788,031 B2 | 9/2004 | Pendell | |
| 6,812,586 B2 | 11/2004 | Wacknov et al. | |
| 6,891,282 B2 | 5/2005 | Gupta et al. | |
| 6,909,199 B2 | 6/2005 | Gupta et al. | |
| 6,998,728 B2 | 2/2006 | Gupta et al. | |
| 7,064,513 B2 | 6/2006 | Fenley | |
| 7,161,253 B2 | 1/2007 | Sodemann et al. | |
| 7,200,994 B2 | 4/2007 | Chertok | |
| 7,212,916 B2 | 5/2007 | Alewine et al. | |
| 7,248,490 B2 | 7/2007 | Olsen et al. | |
| 7,262,694 B2 | 8/2007 | Olsen et al. | |
| 7,274,975 B2 | 9/2007 | Miller | |
| 7,385,373 B2 | 6/2008 | Doruk et al. | |
| 7,388,299 B2 | 6/2008 | Blackman | |
| 7,566,991 B2 * | 7/2009 | Blackman | 307/65 |
| 7,579,702 B2 | 8/2009 | Park et al. | |
| 7,609,019 B2 * | 10/2009 | Beck et al. | 318/480 |
| 7,737,571 B2 | 6/2010 | Fein et al. | |
| 7,888,916 B1 * | 2/2011 | Taylor | 322/100 |
| 7,999,405 B2 | 8/2011 | Peterson | |
| 8,097,967 B2 | 1/2012 | Hamilton | |
| 8,319,358 B2 | 11/2012 | Hamilton | |
| 2002/0070716 A1 | 6/2002 | Gupta et al. | |
| 2002/0175522 A1 | 11/2002 | Wacknov et al. | |
| 2003/0230690 A1 | 12/2003 | Ostrovsky et al. | |
| 2004/0066177 A1 | 4/2004 | Gupta et al. | |
| 2004/0090211 A1 | 5/2004 | Gupta et al. | |
| 2004/0201218 A1 | 10/2004 | Hebert | |
| 2004/0262996 A1 | 12/2004 | Olsen et al. | |
| 2004/0263116 A1 | 12/2004 | Doruk et al. | |
| 2005/0153173 A1 | 7/2005 | Kumashiro et al. | |
| 2005/0185429 A1 | 8/2005 | Vinciarelli | |
| 2006/0032045 A1 | 2/2006 | Naarmann et al. | |
| 2006/0129283 A1 | 6/2006 | Alewine et al. | |
| 2006/0237970 A1 | 10/2006 | Bailey | |
| 2007/0005192 A1 | 1/2007 | Schoettle et al. | |
| 2007/0005195 A1 | 1/2007 | Pasquale et al. | |
| 2007/0063677 A1 | 3/2007 | Schauder | |
| 2007/0182383 A1 | 8/2007 | Park et al. | |
| 2007/0203860 A1 | 8/2007 | Golden et al. | |
| 2007/0230427 A1 | 10/2007 | Arseneault et al. | |
| 2007/0271006 A1 | 11/2007 | Golden et al. | |
| 2007/0276547 A1 | 11/2007 | Miller | |
| 2007/0290636 A1 | 12/2007 | Beck et al. | |
| 2007/0296221 A1 | 12/2007 | Blackman | |
| 2008/0040223 A1 | 2/2008 | Bridges et al. | |
| 2008/0040295 A1 | 2/2008 | Kaplan et al. | |
| 2008/0048854 A1 | 2/2008 | Olsen et al. | |
| 2008/0114499 A1 | 5/2008 | Hakim et al. | |
| 2008/0143302 A1 | 6/2008 | Pierce | |
| 2008/0167756 A1 | 7/2008 | Golden et al. | |
| 2008/0198747 A1 | 8/2008 | Young et al. | |
| 2008/0281663 A1 | 11/2008 | Hakim et al. | |
| 2009/0160259 A1 | 6/2009 | Naiknaware et al. | |
| 2009/0296432 A1 | 12/2009 | Chapuis | |
| 2010/0006356 A1 | 1/2010 | Curry et al. | |
| 2010/0157632 A1 | 6/2010 | Batten et al. | |
| 2010/0157638 A1 | 6/2010 | Naiknaware et al. | |
| 2010/0320837 A1 | 12/2010 | Harrison | |

FOREIGN PATENT DOCUMENTS

| | | |
|---|---|---|
| DE | 1020117002422 | 1/2012 |
| DE | 2011516761 | 10/2012 |
| JP | 2001-045796 | 2/2001 |
| JP | 2002-044870 A | 2/2002 |
| JP | 2004-140991 | 5/2004 |
| JP | 2011-516761 | 10/2012 |
| KR | 10-0668118 | 1/2007 |
| KR | 10-2008-0110376 | 12/2008 |
| KR | 1020117002422 | 1/2012 |
| NZ | 590217 | 4/2012 |
| TW | I258235 | 7/2006 |
| TW | I 258235 | 7/2006 |
| TW | 098121895 | 10/2012 |
| WO | WO 2009/082721 | 7/2009 |
| WO | PCT/US2009/049039 | 2/2010 |
| WO | PCT/US2009/049039 | 1/2011 |
| WO | PCT/US2010/043883 | 3/2011 |
| WO | PCT/US2010/043883 | 1/2012 |
| WO | PCT/US/2012/036657 | 8/2012 |
| WO | PCT/US/2012036657 | 8/2012 |
| WO | PCT/US/2012/042294 | 1/2013 |

OTHER PUBLICATIONS

U.S. Appl. No. 60/869,439, filed Dec. 11, 2006, Bridges et al.
U.S. Appl. No. 60/822,047, filed Aug. 10, 2006, Kaplan.
U.S. Appl. No. 60/980,663, filed Oct. 17, 2007, Bridges.
A Robust PHEV Logging Solution from V2Green; www.v2green.com; 2008; 6 pp.
Revolutionizing the Way You Think About Energy; www.gridpoint.com; 2008; 28 pp.

* cited by examiner

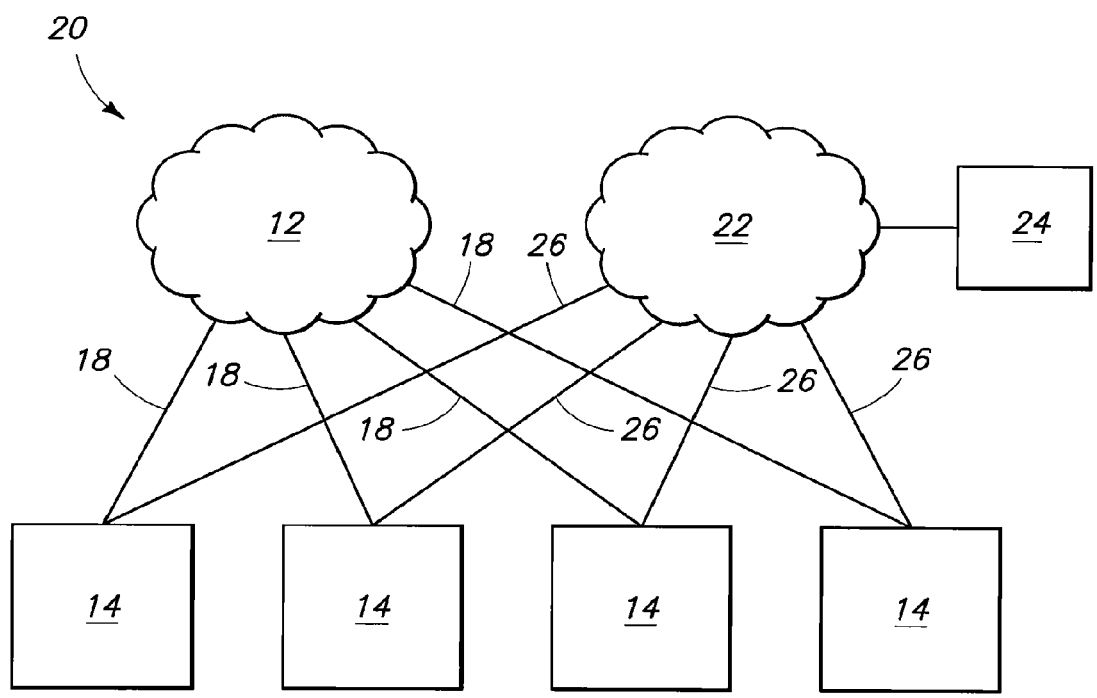

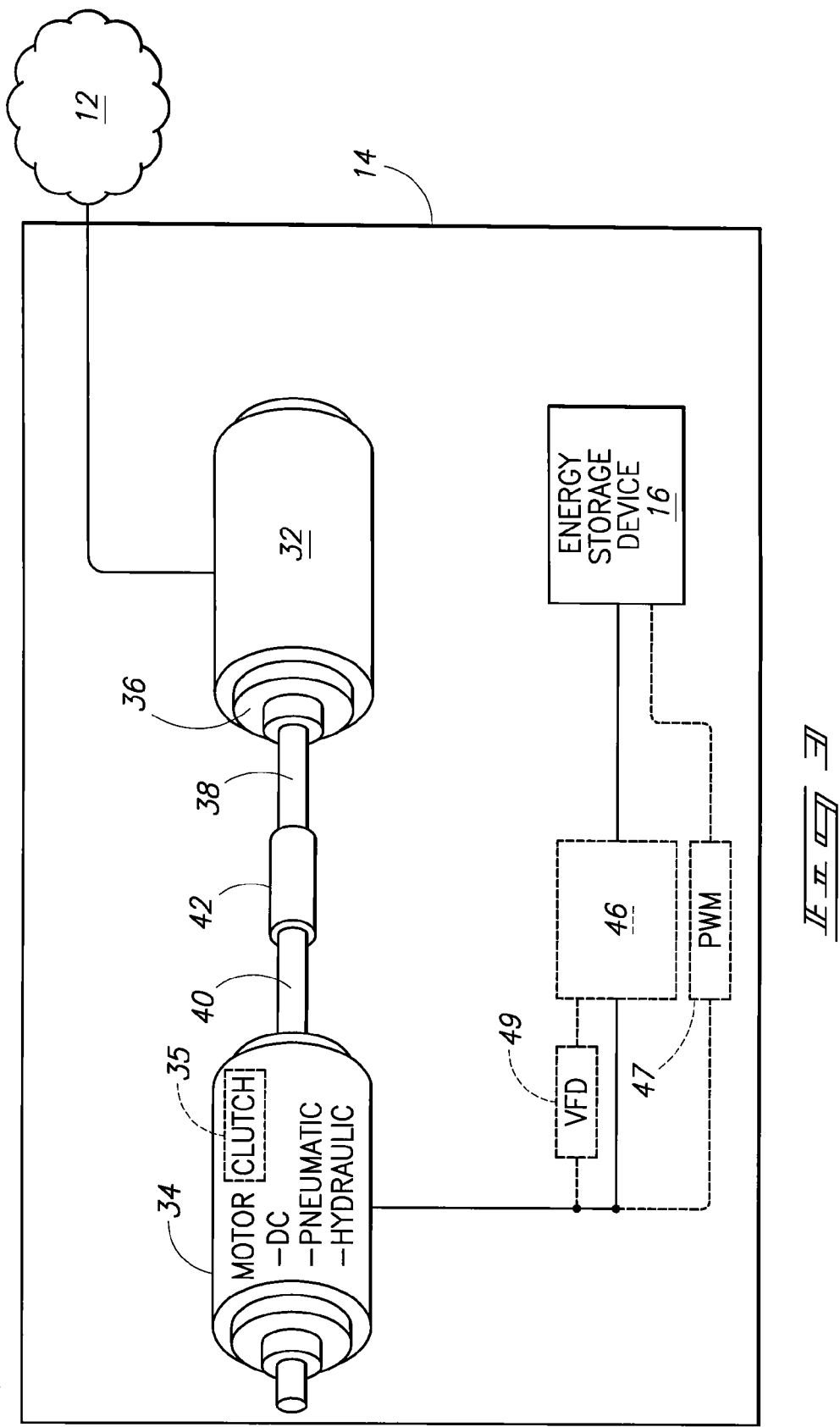

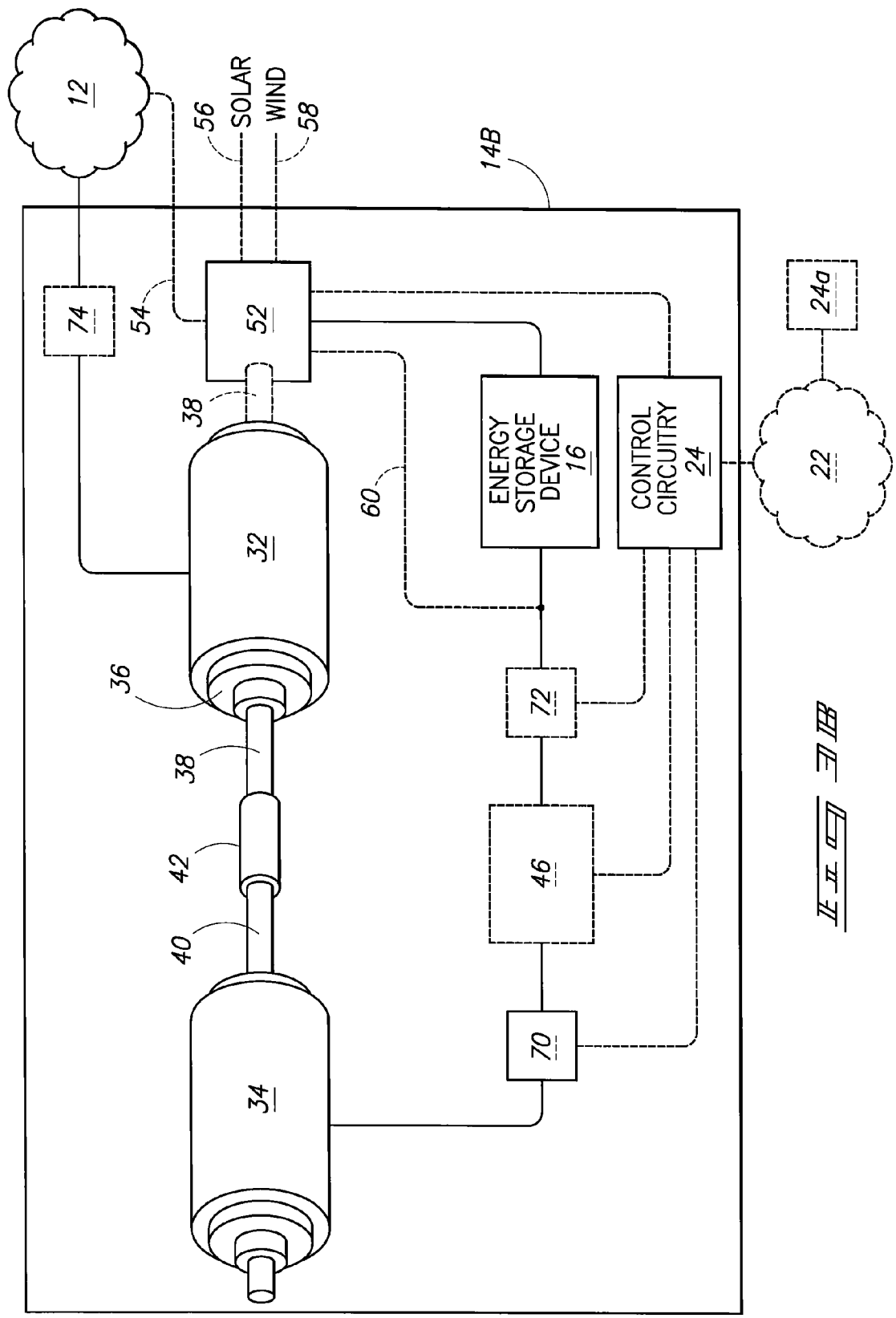

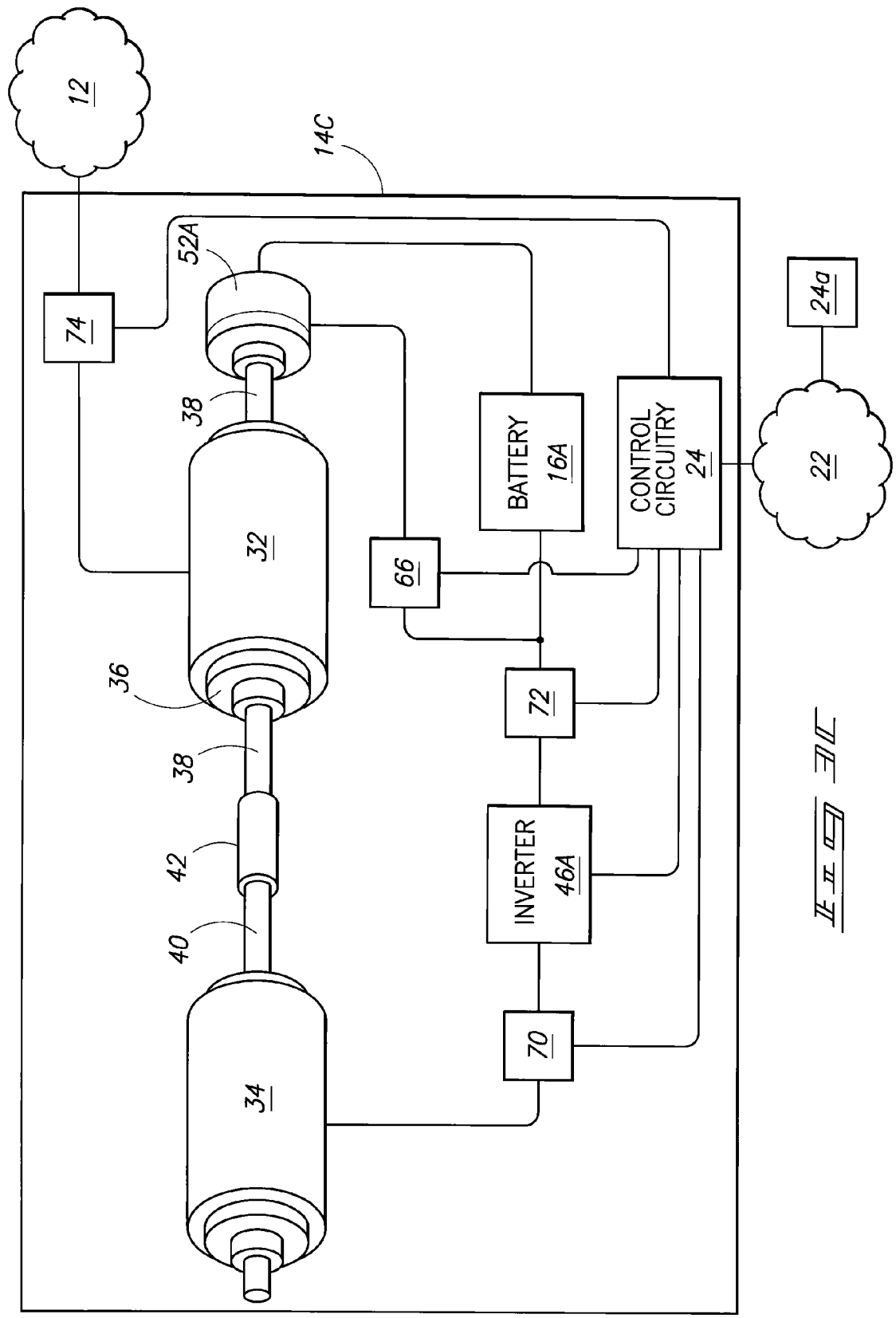

ENERGY SYSTEMS, ENERGY DEVICES, ENERGY UTILIZATION METHODS, AND ENERGY TRANSFER METHODS

CROSS REFERENCE TO RELATED APPLICATION

This application is a continuation of U.S. patent application Ser. No. 12/165,405, which was filed on Jun. 30, 2008 now U.S. Pat. No. 8,097,967 and which is incorporated herein by reference.

TECHNICAL FIELD

The present invention, in various embodiments, relates to energy systems, energy devices, energy utilization methods, and energy transfer methods.

BACKGROUND OF THE INVENTION

Devices exist that generate alternating current (AC) power. Some of these devices are designed to generate AC power when an AC power grid (e.g., an AC power grid operated by an electric utility company) is non-operational. For example, diesel generators are commonly used to provide emergency AC power to buildings housing computers and/or telecommunications equipment. Small devices having a battery and an inverter are also commonly used to provide AC power to a computer in the event of a power grid failure. Such devices are configured to provide AC power while the power grid is non-operational.

Other devices are configured to transfer AC power derived from wind or solar energy to the power grid while the power grid is operational. These devices commonly use inverters to generate AC voltage independent of the power grid and then feed the independently generated power synchronously into the power grid.

BRIEF DESCRIPTION OF THE DRAWINGS

Embodiments of the invention are described below with reference to the following accompanying drawings.

FIG. 2 is an illustrative diagram of a network of energy devices.
FIG. 3 is a block diagram of an energy device.
FIG. 3B is a block diagram of an energy device.
FIG. 3C is a block diagram of an energy device.

DETAILED DESCRIPTION

According to some aspects of the disclosure, an energy system may provide power to a power grid while the power grid is operational. In one embodiment, the energy system may include an induction generator having a shaft and a stator. The induction generator may be connected to the power grid so that the power grid supplies an excitation voltage and inductive current for the induction generator. In one embodiment, the energy system may also include a motor. The motor may use energy stored by an energy storage device to rotate a rotor coupled to the shaft of the induction generator at a rotational speed greater than a synchronous speed of the induction generator in one embodiment. Consequently, the induction generator may generate AC power that is transferred to the power grid via induced magnetic coupling between the rotor and the stator.

In some embodiments, the energy system may replenish the energy stored in the energy storage device. In some embodiments, the energy system may store energy in the energy storage device and later use the stored energy to generate AC power and transfer the generated AC power to the power grid.

In some embodiments, the energy system may draw power from the power grid during times when the power is available at a first price and convert the power into energy stored by the energy storage device. Later, the energy system may convert the stored energy into AC power and provide the AC power to the power grid during times when the power may be sold to an entity operating the power grid at a second price that is higher than the first price. Additional aspects of the disclosure are described in the illustrative embodiments below.

Figure 1:
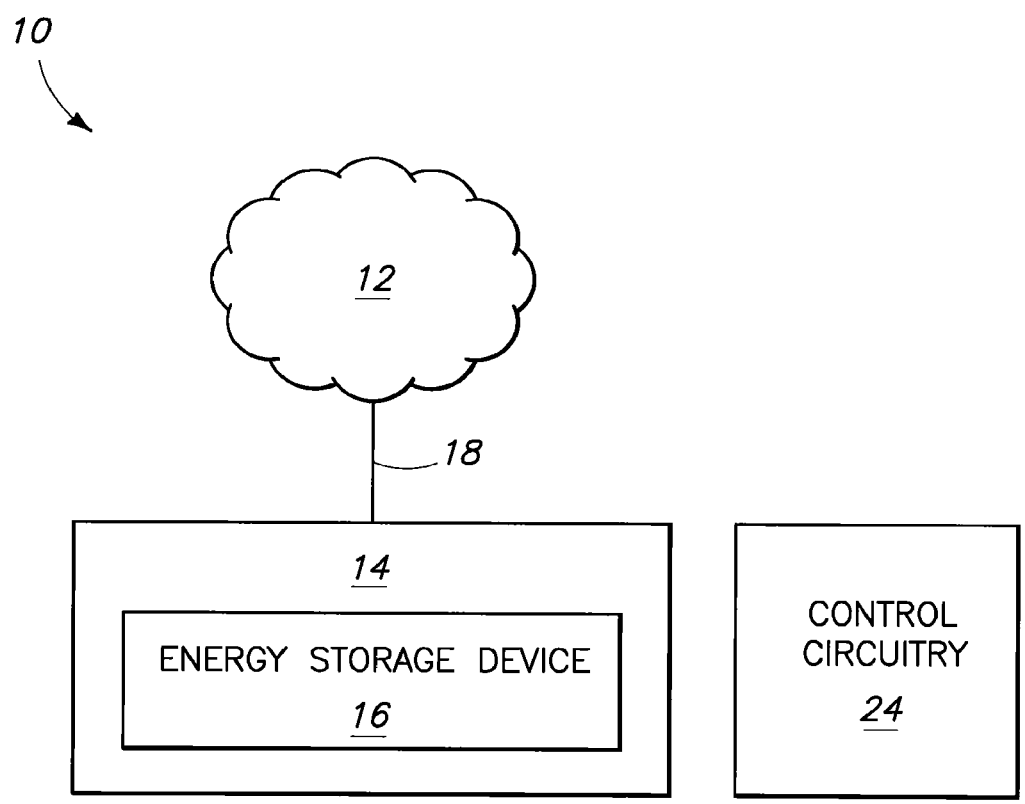
FIG. 1 is a block diagram of an energy system.

Referring to FIG. 1, an energy system 10 according to one embodiment is illustrated. System 10 includes a power grid 12, an energy device 14, and control circuitry 24. Other embodiments of system 10 are possible including more, less, and/or alternative components. In one embodiment, energy device 14 includes energy storage device 16.

Power grid 12 may provide alternating current power to a geographical area via a plurality of electrical generating facilities, transmission lines, and other infrastructure. In some embodiments, power grid 12 may be operated by an electric utility company. The power provided by power grid 12 may have a particular frequency (e.g., 60 Hz). The particular frequency may change over time in some embodiments.

Energy device 14 may operate in one of a plurality of different modes. In an energy storage mode, energy device 14 may draw power from power grid 12 via connection 18 (or in some embodiments draw the power from a power source other than power grid 12) and convert the power into energy suitable for storage in energy storage device 16. In an energy release mode, energy device 14 may convert some or all of the energy stored in energy storage device 16 into power suitable to be transferred to power grid 12 and then transfer the converted power to power grid 12 via connection 18.

Storing energy in energy device 14 and later using the energy to generate power suitable to be transferred to power grid 12 may be economically attractive because in some cases the power transferred to power grid 12 by energy device 14 while in the energy release mode may be more valuable to the utility company operating power grid 12 than the power that energy device 14 draws from power grid 12 while in the energy storage mode.

An AC power grid (such as power grid 12) may provide varying amounts of power to consumers during a twenty-four hour period in one embodiment. The amount of power provided may be greatest during a first portion of the twenty-four hour period. This first portion may be during typical working hours when usage of building lighting, HVAC systems, computers, manufacturing equipment, and the like is greatest. In contrast, power consumption during a second portion of the twenty-four hour period may be significantly lower than the consumption during the first portion. The second portion may be during night hours when most people are sleeping.

Typically, power grids have power generating capacity that meets the needs of the first portion of the twenty-four hour period. However, having such power generating capacity may be inefficient since much of the capacity may go unused during the second portion of the twenty-four hour period. Consequently, some power grid operators offer two different rates for electricity in an attempt to shift power consumption from the first portion of the twenty-four hour period to the second portion. For example, during the first portion, a first rate may be charged for electricity and during the second portion, a cheaper second rate may be charged for electricity. Such a rate structure may encourage consumers of electricity to shift their consumption to the second portion where possible to reduce the amount of money paid for electricity.

In one embodiment, energy device 14 may be configured in the energy storage mode at night when power is sold at the second rate and may be configured in the energy release mode during the day when power generated by energy device 14 may be sold back to the operator of power grid 12 at the more expensive first rate. Although the operator of power grid 12 may lose money in this transaction, the transaction may still be beneficial to the grid operator since energy device 14 may provide power to power grid 12 during periods of peak usage when the grid operator most needs additional power.

Without the power provided by energy device 14, the grid operator may need to start a more expensive or low-efficiency generating facility or buy power from another utility to meet peak power demand during the day. Additionally or alternatively, the grid operator may need to build additional power generating facilities (e.g., natural gas or oil-fired electrical plants) to meet peak demand. Being able to receive power from energy device 14 may be more efficient and cost effective than these traditional approaches to meeting peak power demand.

The above description has assumed that an entity other than the operator of power grid 12 may benefit from energy device 14. Alternatively, in one embodiment, the operator of power grid 12 may own and operate one or more energy devices 14 to provide additional power during periods of peak demand.

In one embodiment, control circuitry 24 may control the operation of energy device 14. For example, control circuitry 24 may configure energy device 14 in the energy release mode during a first portion of a twenty-four hour period (e.g., during the day) and in the energy storage mode during a second portion of a twenty-four hour period (e.g., at night). In one embodiment, control circuitry 24 may determine when demand for power is nearing the capacity of power grid 12 and in response configure energy device 14 in the energy release mode to provide additional power to power grid 12.

Control circuitry 24 may comprise circuitry configured to implement desired programming provided by appropriate media in at least one embodiment. For example, control circuitry 24 may be implemented as one or more of a processor and/or other structure configured to execute executable instructions including, for example, software and/or firmware instructions, and/or hardware circuitry. Example embodiments of control circuitry 24 include hardware logic, PGA, FPGA, ASIC, state machines, and/or other structures alone or in combination with a processor. These examples of control circuitry 24 are for illustration; other configurations are possible.

In one embodiment, control circuitry 24 may be part of energy device 14. Alternatively, control circuitry may be located remotely from energy device 14 as shown as reference 24a. In one embodiment, one portion of control circuitry 24 may be part of energy device 14 and another portion of control circuitry 24 may be remotely located from energy device 14 as shown as reference 24a.

In one embodiment, connection 18 may be a single-phase connection whereby energy device 14 may transfer and/or receive single-phase AC power to/from power grid 12. In another embodiment, connection 18 may be a multi-phase connection (e.g., three-phase connection) whereby energy device 14 may transfer and/or receive multi-phase AC power to/from power grid 12.

Energy device 14 may convert some or all of the energy stored by energy storage device 16 into a format suitable to be transferred to power grid 12. For example, in one embodiment, energy storage device 16 may include a plurality of batteries configured to supply direct current (DC) power and energy device 14 may convert some or all of the DC power from the batteries into single-phase AC power or multi-phase AC power and provide the AC power to power grid 12 via connection 18.

Furthermore, energy device 14 may increase the amount of energy stored by energy storage device 16 by converting energy into a format suitable for energy storage device 16 and then providing the converted energy to energy storage device 16 for storage. For example, in one embodiment, energy storage device 16 may include a plurality of batteries and energy device 14 may provide current to energy storage device 16 to charge the plurality of batteries. Energy device 14 may, in one embodiment, consume power from power grid 12 in charging the batteries.

In some embodiments, a plurality of energy devices, such as energy device 14, may be used to provide power to power grid 12.

Referring to FIG. 2, a system 20 of energy devices 14, according to one embodiment, is illustrated. System 20 includes power grid 12 and a plurality of energy devices 14. Energy devices 14 are connected to power grid 12 via connections 18. Other embodiments of system 20 are possible including more, less, and/or alternative components.

System 20 also includes a communications network 22. Energy devices 14 may be connected to communications network 22 via links 26. In one embodiment, links 26 may be wired links (e.g., telephone lines, fiber optic lines, etc.) or wireless links (e.g., infrared links, radio frequency links, etc.) or a combination of wired and wireless links.

Control circuitry 24 may control energy devices 14 via communications network 22 and links 26. For example, control circuitry 24 may configure energy devices 14 in the energy release mode, the energy storage mode, or in another mode.

In one embodiment, control circuitry 24 may have access to data describing the state of power grid 12 such as data describing an electrical characteristic of power grid 12. For example, control circuitry 24 may know the frequency of AC power provided by power grid 12. Control circuitry 24 may use the data to determine when to configure one or more of energy devices 14 in the energy release mode.

For example, control circuitry 24 may determine that the frequency of power grid 12 is decreasing because demand for power from power grid 12 is increasing. In response, control circuitry 24 may configure a few of energy devices 14 in the energy release mode to supply additional power to power grid 12. If the frequency of power grid 12 increases in response, control circuitry 24 might not configure additional ones of energy devices 14 in the energy release mode. However, if the frequency of power grid 12 continues to decrease, control circuitry 24 may configure additional ones of energy devices 14 in the energy release mode.

Although only four energy devices 14 are depicted in FIG. 2, in some embodiments, network 20 may include thousands or millions of energy devices 14 connected to power grid 12. This large number of energy devices may be able to provide a substantial amount of power to power grid 12. For example, in some embodiments, thousands of kilowatts of power may be provided to power grid 12, which in some cases may be enough to temporarily keep power grid 12 stable for a period of time if one or more of the power generating facilities (e.g., power plants) of power grid 12 fails.

Referring to FIG. 3, an energy device 14 according to one embodiment is illustrated. Energy device 14 includes a motor 34 having a shaft 40, a generator 32 having a shaft 38 and a stator 36, and energy storage device 16. In some embodiments, energy device 14 also includes energy adapter 46. Other embodiments are also possible including more, less, and/or alternative components.

Shaft 40 may be coupled to shaft 38 via coupling 42 so that when shaft 40 is rotated, shaft 38 also rotates and conversely when shaft 38 is rotated, shaft 40 is also rotated. In one embodiment, coupling 42 may be a flexible coupling. In one embodiment, shafts 38, 40 may be referred to as first and second shafts, respectively.

Motor 34 may use energy from energy storage device 16 to rotate shaft 40. In one embodiment, motor 34 may use energy directly from energy storage device 16. For example, motor 34 may be a DC motor and energy storage device may be a battery. Alternatively, energy device 14 may include energy adapter 46, which may convert energy from energy storage device 16 into a form usable by motor 34. For example, motor 34 may be an AC motor, energy storage device 16 may include a battery, and energy adapter 46 may be an inverter configured to convert DC current from the battery into AC power usable by motor 34.

Other embodiments of motor 34 and energy storage device 16 are also possible. In one embodiment, motor 34 may be a pneumatic motor and energy storage device 16 may store compressed air or a compressed gas. In another embodiment, motor 34 may be a hydraulic motor and energy storage device 16 may store a pressurized or unpressurized liquid. In yet another embodiment, motor 34 may be a DC electric motor, energy storage device 16 may store hydrogen, and energy adapter 46 may be a fuel cell that produces DC current using the stored hydrogen. Other embodiments of motor 34 are also possible.

Motor 34 may rotate shaft 40. Since shaft 40 may be coupled to shaft 38 via coupling 42, motor 34 may rotate shaft 38 in addition to rotating shaft 40.

Generator 32 may be an induction generator and may be a single-phase induction generator or a multi-phase (e.g., three-phase) induction generator. Accordingly, generator 32 may include shaft 38, a rotor (not illustrated) coupled to shaft 38 and a stator 36. Stator 36 may be adjacent to shaft 38 and, in one embodiment, may at least partially surround shaft 38 and the rotor. When an alternating current excitation voltage is applied to stator 36, stator 36 may induce currents in the rotor. The currents may cause magnetic fields in the rotor that interact with magnetic fields present in stator 36 to rotate shaft 38. In some embodiments, current is not directly supplied to the rotor. Instead, the excitation voltage applied to the stator induces current in the rotor. In one embodiment, the generator may be referred to as asynchronous.

Stator 36 may be electrically connected to power grid 12 so that power grid 12 supplies an excitation voltage to stator 36. The excitation voltage may be an AC voltage.

In one embodiment, the motor and generator may share a single shaft. The motor may rotate the shaft when supplied with energy, for example by rotating a first rotor attached to the single shaft and associated with the motor. The generator may generate power when a second rotor (associated with the generator) attached to the single shaft and located adjacent to the stator of the generator is rotated by the motor and may transfer the generated power to the power grid. In one embodiment, the motor, the generator, and the single shaft may be within a single housing.

Generator 32 may have an associated synchronous speed related to the frequency of the excitation voltage provided by power grid 12 and the number of poles in stator 36. In one embodiment, stator 36 has two poles and the synchronous speed in revolutions per minute is the frequency of the excitation voltage multiplied by sixty. For example, if the frequency of the excitation voltage is 60 Hz, the synchronous speed is 3600 rpm. In some embodiments, the frequency of the excitation voltage supplied by power grid 12 may change over time. Accordingly, the synchronous speed of generator 32 may correspondingly change over time as the frequency of the excitation voltage changes.

In one configuration, energy from energy storage device 16 may be prevented from reaching motor 34, for example, because a switch or valve is turned off. In this configuration, motor 34 does not rotate shaft 40. However, in this configuration, power grid 12 may supply an excitation voltage to stator 36 and generator 32 may operate as a motor that turns shaft 38. Since shaft 38 is coupled to shaft 40, generator 32 may rotate shaft 40 as well as shaft 38. Thus, shaft 40 may rotate even though motor 34 is not operational (i.e., not consuming energy from energy storage device 16).

Generator 32 may rotate shafts 38 and 40 at a rotational speed that is less than the synchronous speed of generator 32. The difference between the rotational speed and the synchronous speed may be referred to as the slip of generator 32. In this configuration, generator 32 might not provide any power to power grid 12. Instead, generator 32 may consume power provided by power grid 12.

In the energy release mode, energy from energy storage device 16 is allowed to reach motor 34 (either directly or via energy adapter 46). In this configuration, motor 34 rotates shaft 40 and therefore rotates shaft 38 as well. Motor 34 may be configured to rotate shaft 40 at a constant rotational speed. For example, motor 34 may be a DC motor and energy device 14 may include a pulse width modulator 47 configured to provide DC power to motor 34 at a constant average rate from energy storage device 16 until energy storage device 16 is no longer able to provide DC power at the constant average rate. Since motor 34 receives DC power at the constant average rate from the pulse width modulator, motor 34 may rotate shaft 40 at a constant rotational speed.

Similarly, motor 34 may be an AC motor and energy device 14 may include a variable frequency drive 49 configured to provide AC power to motor 34 at a constant average frequency from energy storage device 16 until energy storage device 16 is no longer able to provide AC power at the constant average frequency.

The constant rotational speed may be higher than the synchronous speed of generator 32. In this case, when stator 36 is electrically connected to power grid 12 and is receiving an excitation voltage from power grid 12, generator 32 may supply AC power to power grid 12 via stator 36. The amount of power supplied to power grid 12 may depend on the difference between the constant rotational speed and the synchronous speed.

The power may result from the rotor of generator 32 inducing current into stator 36, which provides the induced current to power grid 12. However, in one embodiment, the power may be generated only if power grid 12 is electrically connected to stator 36 and is supplying an AC excitation voltage to stator 36. Accordingly, if power grid 12 is electrically disconnected from stator 36, generator 32 might not generate any current or voltage in either the rotor or stator 36.

Since the amount of power supplied to power grid 12 may depend on the difference between the rotational speed of shaft 38 and the synchronous speed of generator 32, and the synchronous speed of generator 32 may change if the frequency of the excitation voltage supplied by power grid 12 changes, the amount of power supplied to power grid 12 may change if the frequency of the excitation voltage changes.

This change in power may help to stabilize power grid 12. For example, the frequency of the excitation voltage supplied by power grid 12 may decrease due to additional demand placed on power grid 12. If the frequency decreases, the synchronous speed of generator 32 will also decrease. Since the rotational speed of shaft 38 (due to motor 34) remains constant, the difference between the rotational speed of shaft 38 and the synchronous speed will increase due to the decrease in frequency of the excitation voltage. Consequently, the amount of power that generator 32 provides to power grid 12 will increase. The increase in power may help meet the increased demand causing the decrease in frequency of the grid voltage which will in turn contribute to increasing the frequency of the grid voltage toward the nominal frequency of power grid 12 (e.g., 60 Hz) thereby stabilizing power grid 12.

Conversely, the frequency of the excitation voltage supplied by power grid 12 may increase due to decreased demand (or increased supply of power) placed on power grid 12. If the frequency increases, the synchronous speed of generator 32 will also increase. Since the rotational speed of shaft 38 (due to motor 34) remains constant, the difference between the rotational speed of shaft 38 and the synchronous speed will decrease due to the increase in frequency of the excitation voltage. Consequently, the amount of power that generator 32 provides to power grid 12 will decrease. The decrease in power may contribute to decreasing the frequency of the grid voltage toward the nominal frequency of power grid 12 thereby stabilizing power grid 12.

Figure 3A:
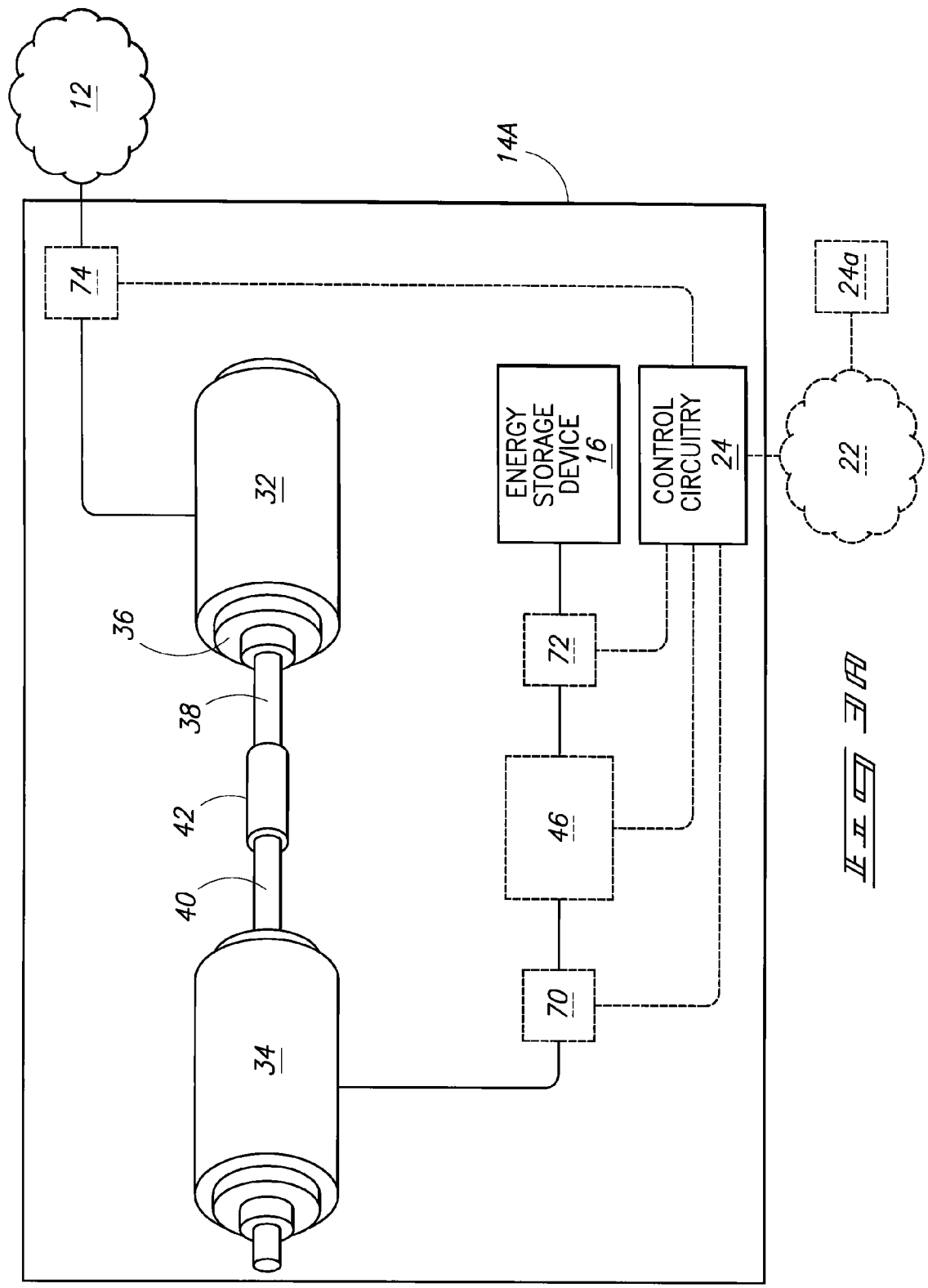
FIG. 3A is a block diagram of an energy device.

Referring to FIG. 3A, an energy device 14A according to one embodiment is illustrated. As is illustrated in FIG. 3A, in one embodiment, energy device 14A includes the elements of energy device 14 described above. In addition, energy device 14A includes control circuitry 24 and may optionally include switches 70, 72, and 74. Other embodiments are also possible including more, less, and/or alternative components.

Switch 70 may selectively allow energy to be transferred from energy adapter 46 to motor 34. Switch 72 may selectively allow energy to be transferred from energy storage device 16 to either energy adapter 46 or to motor 34. Switch 74 may selectively electrically connect motor 32 and/or stator 36 to power grid 12. In one embodiment, switches 70, 72, and 74 may be referred to as contactors.

The portion of control circuitry 24 of energy device 14A may be in communication with another portion of control circuitry 24 via communication network 22. Control circuitry 24 may control the states of switches 70, 72, and 74 by individually opening or closing switches 70, 72, and 74. For example, when energy device 14A is in the energy release mode, control circuitry 24 may close switches 70 and 72 so that energy may flow from energy storage device 16 through energy adapter 46 to motor 34. Accordingly, by controlling switches 70 and 72, control circuitry 24 may selectively cause motor 34 to rotate shaft 40 and/or shaft 38. Furthermore, control circuitry 24 may close switch 74 so that an excitation voltage from power grid 12 may be electrically connected to stator 36. In one embodiment, control circuitry 24 may also control energy adapter 46, for example, by enabling energy adapter 46 to convert energy from energy storage device 16 or by preventing energy adapter 46 from converting energy from energy storage device 16.

In one embodiment, control circuitry 24 may configure energy device 14A in the energy release mode during a particular time (e.g., at night). In another embodiment, control circuitry 24 may detect that a frequency of power grid 12 is below a threshold and in response may configure energy device 14A in the energy release mode. In another embodiment, control circuitry 24 may detect that a frequency of power grid 12 is above a threshold and in response may configure energy device 14A so that energy device 14A is not in the energy release mode. In yet another embodiment, control circuitry 24 may configure energy device 14A in the energy release mode in response to receiving a request from an operator of energy device 14A.

Referring to FIG. 3B, an energy device 14B according to one embodiment is illustrated. As is illustrated in FIG. 3B, in one embodiment, energy device 14B includes the elements of energy device 14A described above. In addition, energy device 14B includes and energy conversion device 52. Other embodiments are also possible including more, less, and/or alternative components.

Energy conversion device 52 may convert energy into a form suitable for storage in energy storage device 16. In one embodiment, energy conversion device 52 may convert energy derived from power grid 12 into a form suitable for storage by energy storage device 16. For example, energy conversion device 52 may convert rotational energy of shaft 38 and/or shaft 40 into a form suitable for storage by energy storage device 16. In one embodiment, energy storage device 16 may include one or more batteries and energy conversion device 52 may convert the rotational energy of shaft 38 and/or shaft 40 into direct current supplied to the one or more batteries. In this example, energy storage device 16 may also include a battery charger that controls the amount of direct current supplied to the one or more batteries.

In one embodiment, energy device 14B may be configured (e.g., by control circuitry 24) in the energy storage mode. In the energy storage mode, switches 70 and/or 72 may prevent energy from energy storage device 16 from reaching motor 34. Accordingly, motor 34 might not rotate shaft 40 and may be referred to as being disabled. Switch 74 may allow stator 36 to be electrically connected to power grid 12. As a result, power grid 12 may supply stator 36 with an AC excitation voltage which may cause shaft 38 (and therefore shaft 40) to rotate. The rotational energy of shafts 38 and/or 40 may be converted to a form suitable for storage by energy storage device 16 as is described above. In the energy storage mode, energy device 14B may consume power from power grid 12.

Since, in one embodiment, generator 32 may rotate shaft 38 and thereby rotate shaft 40 during moments in time when motor 34 is disabled, generator 32 may need to overcome a rotational friction associated with shaft 40 to rotate shaft 40. In one embodiment, motor 34 may include a clutch associated with shaft 40. If the clutch is engaged, motor 34 may rotate shaft 40 but if the clutch is disengaged, motor 34 might not be coupled to shaft 40 and may be unable to rotate shaft 40. When energy device 14B is in the energy storage mode, control circuitry 24 may disengage the clutch so that the rotational friction associated with shaft 40 is less when the clutch is disengaged than when the clutch is engaged. Disengaging the clutch may allow energy device 14B to more efficiently convert energy from power grid 12 into energy stored in energy storage device 16.

In one embodiment, control circuitry 24 may prevent energy conversion device 52 from converting rotational energy of shaft 38 and/or shaft 40 into energy suitable for storage in energy storage device 16 while energy device 14B is configured in the energy release mode so that energy stored in energy storage device 16 is not used to store additional energy in energy storage device 16. For example, in one embodiment, energy conversion device 52 may be an alternator. While in the energy release mode, control circuitry 24 may prevent a field from being applied to the alternator so that the alternator does not generate DC current.

Other embodiments of energy conversion device 52 are also possible. For example, energy conversion device 52 may be a compressor configured to convert rotational energy of shafts 38 and/or 40 into a compressed gas stored in energy storage device 16. In another embodiment, energy conversion device 52 may use power supplied by power grid 12 to create hydrogen fuel, which may be stored in energy storage device 16 and later used by energy adapter 46 to create DC current consumed by motor 34.

In yet another embodiment, energy conversion device 52 may include a battery charger that may draw AC power from power grid 12, convert the AC power from power grid 12 into a DC current, and charge batteries of energy storage device 16 using the DC current. In some configurations, control circuitry 24 may be configured to enable and/or disable the battery charger.

Other embodiments of energy conversion device 52 may convert energy that is not derived from power grid 12 (e.g., naturally occurring energy) into a form suitable for storage in energy storage device 52. For example, energy conversion device 52 may convert solar power 56 and/or wind power 58 into a DC current, which may be used to charge one or more batteries of energy storage device 16.

In one embodiment, motor 34 may be a DC motor having a rotor with one or more magnets. The DC motor may be configured by control circuitry 24 to provide DC current when shafts 38 and 40 are being rotated by generator 32. Control circuitry 24 may control the amount of DC current provided by the DC motor by adjusting the amount of field current supplied to the DC motor. Accordingly, the DC motor may be used to produce a DC current that may be used to charge one or more batteries of energy storage device 16.

In one embodiment, control circuitry 24 may determine an amount of energy stored in energy storage device 16. For example, if energy storage device 16 includes a battery, control circuitry 24 may determine a voltage level of the battery. Control circuitry 24 may use the amount of energy stored to determine when to configure energy device 14B in the energy storage mode. For example, if the amount of energy stored in energy storage device 16 falls below a threshold, control circuitry 24 may configure energy device 14B in the energy storage mode. As a result, additional energy may be stored in energy storage device 16.

Control circuitry 24 may additionally or alternatively configure energy device 14B in the energy release mode based on the amount of energy stored.

In one embodiment, energy device 14B may be configured to fill energy storage device 16 in a first amount of time and to consume the energy stored in energy storage device 16 in a second amount of time. The first amount of time may be less than the second amount of time. For example, if energy storage device 16 includes a battery, energy device 14B may be configured to charge the battery in a first amount of time and to discharge the battery (by powering motor 34 in the energy release mode) in a second amount of time. In some embodiments, the first amount of time may be less than half of the second amount of time.

Referring to FIG. 3C, an energy device 14C according to one embodiment is illustrated. As is illustrated in FIG. 3C, energy device 14C includes motor 34, shaft 40, coupling 42, shaft 38, stator 36, generator 32, control circuitry 24, and switches 70, 72, and 74 described above. In the embodiment of FIG. 3C, motor 34 may be an AC induction motor. In addition, energy device 14C includes a battery 16A, an alternator 52A configured to convert rotational energy of shafts 38 and/or 40 into DC current used to charge battery 16A, a switch 66, and an inverter 46A. Other embodiments are also possible including more, less, and/or alternative components.

Inverter 46A may convert DC current supplied by battery 16A into AC power supplied to AC induction motor 34. In one embodiment, the AC power produced by inverter 46A may have a frequency higher than the frequency of the AC power supplied by power grid 12. For example, the AC power supplied by power grid 12 may have a frequency of 60 Hz and the AC power supplied by inverter 46A may have a frequency of 65 Hz.

Since motor 34 is supplied with the AC power provided by inverter 46A (which has a frequency higher than the frequency of the AC power supplied by power grid 12), motor 34 may have a higher synchronous speed than the synchronous speed of generator 32. Accordingly, motor 34 may rotate shafts 40 and 38 at a rotational speed higher than the synchronous speed of generator 32 which, as was described above, may generate power that may be provided to power grid 12 via stator 36.

Switch 66 may be used to allow or prevent a field current from being supplied to alternator 52A from battery 16A. Allowing the field current may enable alternator 52A to produce DC current from rotational energy of shafts 40 and/or 38, for example, when energy device 14C is in the energy storage mode. Preventing the field current may prevent alternator 52A from producing DC current from rotational energy of shafts 40 and/or 38, for example, when energy device 14C is in the energy release mode. Furthermore, preventing the field current may reduce a rotational friction associated with shafts 40 and/or 38 as compared to when the field current is allowed. Reducing the rotational friction may increase the efficiency with which energy device 14C may provide power to power grid 12.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An energy device comprising:
    a motor configured to utilize electrical energy to provide a rotational force;
    an induction generator which is configured to receive the rotational force provided by the motor and to generate electrical energy as a result of the received rotational force;
    an interface which is configured to conduct the electrical energy generated by the induction generator to an AC power grid which is electrically coupled with the interface;
    electrical energy storage circuitry configured to store electrical energy from a power source which is distinct from the AC power grid; and
    wherein the electrical energy storage circuitry provides stored electrical energy to the motor to be utilized by the motor to provide the rotational force.

2. The device of claim 1 wherein the motor is configured to utilize the stored electrical energy comprising a first form of electrical energy to provide the rotational force and the induction generator is configured to generate the electrical energy comprising a second form of electrical energy which is different than the first form of electrical energy.

3. The device of claim 2 wherein the first form of electrical energy is direct current electrical energy and the second form of electrical energy is alternating current electrical energy.

4. The device of claim 3 wherein the induction generator utilizes excitation electrical energy from the AC power grid to generate the alternating current electrical energy which is synchronized with the excitation electrical energy.

5. The device of claim 1 wherein the motor comprises an AC induction motor.

6. The device of claim 1 further comprising a variable frequency drive which is configured to provide the stored electrical energy from the electrical energy storage circuitry to the motor.

7. The device of claim 1 wherein the power source comprises an energy conversion device which is configured to provide the electrical energy which is stored by the electrical energy storage circuitry.

8. The device of claim 7 wherein the enemy conversion device is configured to convert naturally occurring energy to the electrical energy which is stored by the electrical energy storage circuitry.

9. The device of claim 7 wherein the energy conversion device is configured to convert energy which is derived from the AC power grid to the electrical energy which is stored by the electrical energy storage circuitry.

10. The device of claim 7 wherein the energy conversion device is configured to convert rotational energy to the electrical energy which is stored by the electrical energy storage circuitry.

11. The device of claim 7 wherein the energy conversion device comprises a battery charger which is configured to provide the electrical energy which is stored by the electrical energy storage circuitry.

12. The device of claim 1 wherein the induction generator utilizes excitation electrical energy to generate the electrical energy, and wherein different sources provide the excitation electrical energy to the induction generator at different moments in time.

13. The device of claim 1 wherein the induction generator is configured to increase the amount of the electrical energy generated as a result of an increase in demand for electrical energy upon the AC power grid and the induction generator is configured to decrease the amount of the electrical energy generated as a result of a decrease in demand for electrical energy upon the AC power grid.

14. The device of claim 1 wherein the induction generator utilizes excitation electrical energy from the AC power grid to generate the electrical energy, and wherein the induction generator is configured to increase the amount of the electrical energy generated as a result of a decrease in frequency of the excitation electrical energy and to decrease an amount of the electrical energy generated as a result of an increase in frequency of the excitation electrical energy.

15. The device of claim 1 wherein the induction generator utilizes excitation electrical energy to generate the electrical energy, and wherein the generation of the electrical energy of the induction generator is automatically disabled in an absence of the excitation electrical energy.

16. The device of claim 1 further comprising a single housing which is configured to house the motor and the induction generator.

17. The device of claim 1 wherein the rotational force provided by the motor is provided to the induction generator via a single shaft.

18. The device of claim 1 wherein the induction generator comprises a shaft and the induction generator is configured to generate the electrical energy as a result of the received rotational force rotating the shaft at a speed which is greater than a synchronous speed of the induction generator.

19. The device of claim 1 wherein the induction generator comprises a stator which is configured to provide the electrical energy generated by the induction generator to the interface.

20. The device of claim 1 wherein the power source comprises the motor which is configured to provide the electrical energy which is stored by the electrical energy storage circuitry.

21. An energy transfer method comprising:
using a motor, generating a rotational force;
providing the rotational force to an induction generator;
using the induction generator, generating electrical energy as a result of the providing the rotational force;
conducting the electrical energy generated by the induction generator to an AC power grid;
using electrical energy storage circuitry, storing electrical energy from a power source which is distinct from the AC power grid; and
providing electrical energy from the electrical energy storage circuitry to the motor to be utilized by the motor to generate the rotational force.

22. The method of claim 21 wherein the electrical energy provided from the electrical enemy storage circuitry to the motor is a first form of electrical energy and the electrical enemy generated by the induction generator is a second form of electrical energy which is different than the first form of electrical enemy.

23. The method of claim 22 wherein the first form of electrical energy is direct current electrical enemy and the second form of electrical energy is alternating current electrical enemy.

24. The method of claim 23 wherein the generating the electrical energy comprises generating using excitation electrical energy from the AC power grid and the electrical enemy generated by the induction generator is synchronized with the excitation electrical energy.

25. The method of claim 21 wherein the providing electrical energy from the electrical enemy storage circuitry to the motor comprises providing using a variable frequency drive.

26. The method of claim 21 further comprising, using the power source, converting energy from an initial form of energy to the electrical energy which is stored by the electrical energy storage circuitry.

27. The method of claim 26 wherein the converting comprises converting naturally occurring energy to the electrical energy which is stored by the electrical energy storage circuitry.

28. The method of claim 26 wherein the converting comprises converting rotational energy to the electrical energy which is stored by the electrical energy storage circuitry.

29. The method of claim 26 wherein the converting comprises converting energy which is derived from the AC power grid to the electrical energy which is stored by the electrical energy storage circuitry.

30. The method of claim 21 further comprising, using a battery charger of the power source, providing the electrical energy which is stored by the electrical energy storage circuitry.

31. The method of claim 21 wherein the generating the electrical energy comprises generating using excitation electrical energy from different sources at different moments in time.

32. The method of claim 21 wherein the generating the electrical energy comprises increasing the amount of the electrical energy generated as a result of an increase in demand for electrical energy upon the AC power grid and decreasing the amount of the electrical energy generated as a result of a decrease in demand for electrical energy upon the AC power grid.

33. The method of claim 21 wherein the generating the electrical energy comprises: generating using excitation electrical energy, increasing the amount of the electrical energy generated as a result of a decrease in frequency of the excitation electrical energy, and decreasing an amount of the electrical energy generated as a result of an increase in frequency of the excitation electrical energy.

34. The method of claim 21 wherein the generating the electrical energy comprises generating using excitation electrical energy, and further comprising automatically disabling the generating the electrical energy in an absence of the excitation electrical energy.

35. The method of claim 21 wherein the providing the rotational force comprises providing the rotational force from the motor to the induction generator using a single shaft.

36. The method of claim 21 wherein the providing the rotational force comprises providing the rotational force from the motor to a shaft of the induction generator, and the generating the electrical enemy comprises generating the electrical energy as a result of the rotational force rotating the shaft at a speed which is greater than a synchronous speed of the induction generator.

37. The method of claim 21 wherein the conducting comprises conducting the electrical energy generated by the induction generator from a stator of the induction generator to the AC power grid.

38. The method of claim 21 wherein the power source comprises the motor, and the storing comprises storing electrical enemy from the motor.

* * * * *

UNITED STATES PATENT AND TRADEMARK OFFICE
CERTIFICATE OF CORRECTION

PATENT NO. : 8,508,058 B2
APPLICATION NO. : 13/330548
DATED : August 13, 2013
INVENTOR(S) : Scott Robert Hamilton Page 1 of 1

It is certified that error appears in the above-identified patent and that said Letters Patent is hereby corrected as shown below:

Title Page, Item (56) References Cited, Foreign Patent Documents – Replace "DE 1020117002422 1/2012" with --KR 1020117002422 1/2012--

Title Page, Item (56) References Cited, Foreign Patent Documents – Replace "DE 2011516761 10/2012" with --JP 2011516761 10/2012--

In the Claims

Column 11, line 18 – Replace "the enemy conversion" with --the energy conversion--

Column 12, line 26 – Replace "enemy storage" with --energy storage--

Column 12, line 28 – Replace "enemy generated" with --energy generated--

Column 12, line 30 – Replace "electrical enemy" with --electrical energy--

Column 12, line 32 – Replace "electrical enemy" with --electrical energy--

Column 12, lines 33-34 – Replace "electrical enemy" with --electrical energy--

Column 12, line 38 – Replace "electrical enemy" with --electrical energy--

Column 12, line 42 – Replace "electrical enemy" with --electrical energy--

Column 14, line 7 – Replace "electrical enemy" with --electrical energy--

Column 14, lines 16-17 – Replace "electrical enemy" with --electrical energy--

Signed and Sealed this
Nineteenth Day of July, 2016

Michelle K. Lee
*Director of the United States Patent and Trademark Office*